United States Patent Office 3,816,489
Patented June 11, 1974

3,816,489
INCREASING THE SELECTIVITY AND YIELD IN THE PRODUCTION OF CARBOXYLIC ACIDS
John H. Craddock, Ballwin, Arnold Hershman, and Frank E. Paulik, St. Louis, and James F. Roth, Maryland Heights, Mo., assignors to Monsanto Company, St. Louis, Mo.
No Drawing. Continuation-in-part of application Ser. No. 752,795, Aug. 15, 1968. This application July 1, 1970, Ser. No. 51,700
The portion of the term of the patent subsequent to May 18, 1988, has been disclaimed
Int. Cl. C07c 51/14
U.S. Cl. 260—413                                   11 Claims

ABSTRACT OF THE DISCLOSURE

The present invention relates to an improved process for the production of carboxylic acids, specifically by the reaction of ethylenically unsaturated compounds with carbon monoxide and water, in the presence of catalyst compositions essentially comprising iridium compounds and complexes, together with an iodide promoter in critical proportions. The process is particularly useful for the production of terminal carboxylic acids.

---

The present patent application is a continuation-in-part of U.S. patent application Ser. No. 752,795 filed Aug. 15, 1968.

This invention relates to an improved process for the production of carboxylic acids. More particularly, it relates to a process for the reaction of ethylenically unsaturated compounds with carbon monoxide and water in the presence of catalyst compositions essentially comprising iridium compounds and complexes and an iodide promoter in critical proportions, to yield predominantly terminal carboxylic acids selectively and efficiently. The present process is also characterized by superior selectivity and reaction rate.

Processes for the preparation of carboxylic acids from olefins, and other ethylenically unsaturated compounds, carbon monoxide and water are well known in the art and have been directed to the production of carboxylic acids and ester derivatives. The prior art teaches the use of a number of catalysts for the synthesis of carboxylic acids by reaction of olefins with carbon monoxide and water at elevated temperatures and pressures. Catalysts such as phosphoric, boric, arsenic, and monochloroacetic acids; acetyl chloride on active carbon; boron trifluoride; barium and calcium halides; salts and carbonyls of nickel and cobalt, especially halides; and in general, the Group VIII metals and simple salts, carbonyls and complexes; have been reported to function for the production of carboxylic acids and esters by reaction of olefins and carbon monoxide in the presence of water or other hydroxylic compounds at temperatures from 130° C.–375° C. and pressures up to 1,000 atmospheres. However, even under such severe conditions the yields of acid were substantially poor, and therefore uneconomical. Somewhat less severe reaction conditions of temperature and/or pressure have been reported in the literature employing specific catalyst compositions, e.g., 200° C. to 300° C. and 150 to 200 atmospheres in the presence of 87% phosphoric acid; 300° C. to 375° C. and 450 to 740 atmospheres in the presence of nickel carbonyl promoted by nickel chloride and hydrochloric acid; or 85° C. to 250° C. and 100 to 1,000 atmospheres in the presence of palladium phosphine complex catalysts.

Even using the prior art specific catalyst compositions and reaction conditions, substantially poorer yields, i.e., lower conversion and/or lower selectivity to the terminal and/or the linear normal isomer of the desired carboxylic acid product and substantially slower reaction rates are obtained than those achieved in the process of this invention.

Certain disadvantages present in the carbonylation processes described in the prior art are catalyst instability, lack of product selectivity, and low levels of catalyst reactivity. One particular disadvantage of olefin carbonylation processes of the prior art is their dependence upon the use of catalysts comprised of metal carbonyls or certain modified metal carbonyls including dicobalt octacarbonyl, iron carbonyl and nickel carbonyl, all of which require the use of high partial pressures of carbon monoxide to remain stable under the necessarily high reaction temperatures employed. For example, dicobalt octacarbonyl requires partial pressures of carbon monoxide as high as 3,000 p.s.i.g. to 10,000 p.s.i.g. under normal carbonylation conditions of 175° C. to 300° C Still another disadvantage of carbonylation processes for ethylenically unsaturated compounds disclosed in the prior art is their relatively low level of activity This low level of activity requires higher catalyst and halogen promoter concentrations, longer reaction times, higher reactor pressures, and higher temperatures to obtain substantial reaction rates and conversions. Consequently, very large and costly processing equipment is required.

Another disadvantage of carbonylation processes disclosed heretofore, which employ feed stocks having ethylenically unsaturated linkages, is their inability to maintain high selectivity to the desired carboxylic acid at temperatures and halogen promoter levels required for high conversion levels and high reaction rates. At these higher temperatures and higher halide promoter concentrations undesirable by-products comprising substantial amounts of ethers, aldehydes, ketones, higher carboxylic acids and alcohols, carbon dioxide, methane and water are formed, thereby resulting in substantial yield losses and necessitating additional product purification and recycle steps in the processing. In addition, the selectivity to desirable terminal and/or linear normal carboxylic acids is substantially reduced for acids containing greater than 3 carbon atoms per molecule.

It is therefore, an object of the present invention to overcome the above disadvantages and thus provide an improved and more economically and commercially feasible carbonylation process for the production of organic acids from ethylenically unsaturated compounds, in liquid phase and vapor phase processes.

Another object of this invention is to provide a more reactive and more stable carbonylation catalyst composition than has been heretofore described in the prior art.

Still another object of the present invention is to provide a more selective and more reactive carbonylation catalyst composition for the production of predominantly terminal and/or linear normal carboxylic acids from ethylenically unsaturated compounds.

Another object of the present invention is to provide a carbonylation catalyst composition which results in the production of a higher yield of the desired carboxylic acid with no substantial formation of ethers, aldehydes, ketones, higher carbon number carboxylic acids and alcohols, carbon dioxide, methane, water and other undesirable by-products.

Still another object of the present invention is the provision of an improved carbonylation process enabling the efficient and selective production of carboxylic acids by reaction of ethylenically unsaturated compounds with carbon monoxide and water in the presence of an improved and more stable catalyst, thus enabling the use of lower catalyst concentration, lower halogen promoter concentration, lower temperature, lower pressure, and shorter contact time than has been generally possible heretofore and facilitating product isolation, catalyst recovery and recycle without substantial catalyst decomposition and loss. The present catalyst may be employed using a solution of the catalyst (liquid phase operation) or a solid catalyst (vapor phase operation).

In accordance with the present invention superior yields of terminal carboxylic acids are obtained by reaction of ethylenically unsaturated compounds in the liquid phase or vapor phase with carbon monoxide and water at temperatures from about 50° C. to 300° C., preferably 125° C. to 225° C., and at partial pressures of carbon monoxide from 1 p.s.i.a. to 15,000 p.s.i.a., preferably 5 p.s.i.a. to 3,000 p.s.i.a., and more preferably 25 p.s.i.a. to 1,000 p.s.i.a., although higher pressure may be employed, in the presence of a catalyst system comprised of an iridium containing component, and a promoter portion, i.e., an iodide used in critical ratios defined herein. The iodide may be derived from iodine or iodine compounds. The present process is particularly advantageous for production of linear normal carboxylic acids from alpha and/or internal olefin feed.

As referred to above, for purposes of the present invention, the catalyst system essentially includes an iridium component and a halogen component in which the halogen is iodine. Generally the iridium component of the catalyst system of the present invention is believed to be present in the form of a coordination compound of iridium with an iodide component providing at least one of the ligands of such coordination compound. In addition to the iridium and iodide in the process of the present invention, these coordination compounds also generally include carbon monoxide ligands thereby forming such compounds or complexes of iridium as $Ir(CO)_3I$, $IR(CO)_2I_2$, and the like. Other moieties may be present if desired. Generally, it is preferred that the catalyst system contain as a promoting component, an excess of iodide over that present as ligands in the iridium coordination compound. The terms "coordination compound" and "coordination complex" used throughout this specification means a compound or complex formed by combination of one or more electronically rich molecules or atoms capable of independent existence with one or more electronically poor molecules or atoms, each of which may also be capable of independent existence.

The essential iridium and iodide components of the catalyst system of the present invention may be provided by introducing into the reaction zone a coordination compound of iridium containing iodide ligands or may be provided by introducing into the reaction zone separately an iridium compound and an iodine compound. Among the materials which may be charged to the reaction zone to provide the irridium component of the catalyst system of the present invention are iridium metal, iridium salts and oxides, organo iridium compounds, coordination compounds of iridium and the like. Specific examples of materials capable of providing the iridium component of the catalyst system of the present invention may be taken from the following non-limiting partial list of suitable materials.

$IrCl_3$
$IrBr_3$
$[(n-C_4H_9)_4][Ir(CO)_2X_2]$ where $X=Br^-$, $I^-$
$[(n-C_4H_9)_4As]_2[Ir_2(CO)_4Y_4]$ where $Y=Br^-$
$IrI_3$
$IrCl_3 \cdot 4H_2O$
$IrBr_3 \cdot 4H_2O$
$Ir(CO)_2Cl_2$
$Ir(CO)_2Br_2$
$Ir(CO)_2I_2$
$Ir_2(CO)_8$
$Ir[(C_6H_5)_3P]_2(CO)I$
$Ir[(C_6H_5)_3P]_2(CO)Cl$
$IrCl[(C_6H_5)_3P]_2(CH_3I)_2$
$Ir(SnCl_3)[(C_6H_5)_3P]_3$
Ir metal
$Ir(NO_3)_3$ $IrCl(CO)[(C_6H_5)_3As]_2$
$IrI(CO)[(C_6H_5)_3Sb]_2$
$[(n-C_4H_9)_4P][IR(CO)I_4]$
$Ir[(C_6H_5)_3P]_2(CO)Br$
$Ir[(n-C_4H_9)_3P]_2(CO)Br$
$Ir[(n-C_4H_9)_3P]_2(CO)I$
$IrBr[(C_6H_5)_3P]_3$
$IrI[(C_6H_5)_3P]_3$
$IrCl[(C_6H_5)_3P]_3$
$IrCl[(C_6H_5)_3P]_3H_2$
$[(C_6H_5)P]Ir(CO)H$
$[Ir(C_2H_4)_2Cl]_2$
$K_4Ir_2Cl_2(SnCl_3)_4$
$Ir_2O_3$
$K_4Ir_2Br_2(SnBr_3)_4$
$K_4Ir_2I_2(SnI_3)_4$
$IrO_2$ With the above materials capable of providing the iridium component but not containing an iodide component, it will be necessary to introduce into the reaction zone such a halogen component. For example, if the iridium component introduced is iridium metal or $IrO_2$, it will be necessary to introduce a halide component such as methyl iodide, hydrogen iodide, iodine or the like.

As noted above, while the halogen component of the catalyst system may be in combined form with the iridium as, for instance, one or more ligands in a coordination compound of iridium, it generally is preferred to have an excess of halogen present in the catalyst system as a promoting component. By excess is meant an amount of halogen greater than two atoms of halogen per atom of iridium in the catalyst system. This promoting component of the catalyst system consists of iodine and/or iodine compounds such as hydrogen iodide, alkyl- or aryl iodide, metal iodide, ammonium iodide, phosphonium iodide, arsonium iodide, stibonium iodide and the like. The iodide of the promoting component may be the same or different from that already present as ligands in the coordination compound of iridium. Iodine or iodide compounds are suitable for the promoter portion of the catalyst, but those containing iodide are preferred, with hydrogen iodide constituting a more preferred member. Accordingly, suitable compounds providing the promoter portion of the catalyst system of this invention may be selected from the following list of preferred iodine and/or iodine containing compounds:

$RI_n$ where ($n$ is 1–3), R=any alkyl-alkylene or aryl-group, e.g., $CH_3I$, $C_6H_5I$, $CH_3CH_2I$, $ICH_2CH_2I$, etc.

Other examples include $I_2$; $I_3$; HI; and

where R=any alkyl- or aryl-group, e.g.,

$R_4MI$, $R_4MI_3$, or $R_3MI_2$ where

R=hydrogen or any alkyl- or aryl-group, e.g., $NH_4I$, $PH_4I_3$, $PH_3I_2$;
M=N, P, As or Sb $(C_6H_5)_3PI_2$, and/or combinations of R, M and I.

Critical ratios of halogen promoter to active metal catalyst, expressed as the ratio of atoms of iodide promoter to atoms of iridium in the active portion of the catalyst system have been found to exist. Within the range of these critical ratios, significant improvement in the yield of carboxylic acids is obtained as well as enhanced selectivity for the production of terminal and/or linear normal carboxylic acids. Also within this range of critical iodide iridium atomic ratios superior reactivity, i.e. faster reaction rates for conversion of olefins to carboxylic acids are obtained at the enhanced yields and selectivity levels discussed herein.

For example, within the critical ratios alpha and/or internal olefin feed may be employed to obtain significant yields of terminal and/or linear normal carboxylic acids at fast reaction rates. In contrast, catalyst systems of the prior art produce mainly internal or branched carboxylic acids such as pivalic acid from isobutylene feed whereas the present invention yields preferentially the terminal carboxylic acid from the same feed as discussed below.

The optimum critical ratio of promoter iodide atoms to iridium atoms is in the range of 3:1 to 1000:1, employing solvent systems comprised of carboxylic acid/water mixtures. More preferably the range of ratios of I/Ir employed are 3:1 to 100:1.

The exact nature of the optimum critical ratio of iodide promoter to iridium metal atom of the catalytic system has not been completely elucidated, and may vary as a function of other reaction parameters including solvent composition, carbon number and structure of the olefin feed, absolute concentration of catalyst components, e.g. metal and halogen constituents, and water concentration.

Preferably the process of the present invention is carried out in an acidic reaction medium. For purposes of the present invention, an acidic reaction medium is defined as one in which an alkyl iodide is present or will be formed. The alkyl iodide usually is one in which the alkyl radical corresponds to an alkyl radical having the same number of carbon atoms as the olefin feed. For example if the olefin feed is hexene, the alkyl iodide will preferably be hexyl iodide.

Such alkyl iodide may be added to the reaction medium as such or may be formed in situ within the reaction medium from the olefin feed and the iodide present in the catalyst system. The reaction medium is considered acidic when under reaction conditions as herein set forth, at least 0.1% by wt. of the total iodide in the system is present as the alkyl iodide. Preferably, however, at least 1.0% by wt. of the total iodide in the system is present as the alkyl iodide.

The promoter portion or second component of the catalyst may alternatively be charged to the reactor separately from the active catalyst or first component, or it may be incorporated into the active component, e.g., $Ir(CO)I[(C_6H_5)_3P]_2$ or $IrI_3$.

The preparation of the active catalyst complex which includes both iridium and iodide promoter components may be accomplished by a variety of methods. However, it is thought that a substantial part of the precursor iridium component is converted to the monovalent state during the preparative treatment. In general, in the process of this invention, it is preferable to preform the active carbonylation catalyst system which contains both iridium and iodide promoter components. For example, to prepare the catalyst system, the first component of the catalyst system, e.g., finely divided iridium metal (powder), a simple iridium salt or iridium compound as a precursor is dissolved in a suitable medium, and carbon monoxide is bubbled through the above iridium solution, preferably while maintaining gentle heating and stirring of the iridium solution. Then a solution of the desired promoter source is added to form an active catalytic solution containing the necessary iridium and iodide promoter components.

Generally, the active catalyst containing the iridium and promoter components of the catalyst system of this invention may be preformed prior to charging the reactor, or it may be formed in situ in the reactor as discussed above. For example, to prepare the catalyst system, the first component of the catalyst system, e.g., an iridium salt such as $IrCl_3 \cdot 4H_2O$ is dissolved in a suitable solvent such as 2-methoxyethanol. Subsequently, carbon monoxide is bubbled through the solution where an intermediate, such as the dimer $[Ir(CO)_2Cl]_2$, is produced wherein the iridium is in the monovalent state. The second or promoter component is, for example, added to the above solution; e.g., as aqueous HI, elemental iodine, alkyl iodide (with alkyl radicals of 1 to 30 carbon atoms) or other iodine containing compound.

Alternatively, the iridium precursor, e.g., $Na_2IrCl_6$, $Na_2IrBr_6$ or $[Ir(CO)_2Cl]_2$, may be dissolved in 2-methoxyethanol containing a dilute aqueous acid, e.g., HCl, acetic acid, etc., as solvent. Then the solution of the iridium compound is heated, for example, to 60°–80° C., or in general at a temperature below the boiling point of the solvent, with stirring. A reducing agent such as carbon monoxide is bubbled through the said solution to obtain the iridium component at least in part in the monovalent state. Subsequently, the iodine promoter is added as described herein, although the iodine containing promoter may also be added first.

Another embodiment of the present invention employs compounds of monovalent iridium initially, wherein the transformation to active catalyst may not involve a change of valence. For example, monovalent iridium salts such as

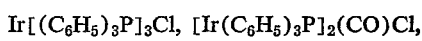

$[Ir(C_6H_5)_3P]_3(CO)H$, and $[Ir(CO)_2Cl]_2$ are dissolved in suitable solvent that is preferably warmed and stirred. Subsequent addition of a solution of the halogen promoter, e.g., alkyl iodide, elemental iodine, aqueous HI, etc., results in formation of an active carbonylation catalyst solution.

Alternate embodiments of the present invention include use of other iridium components in various oxidation states and ligand environments, e.g., iridium metal (zero valence state), iridium salts, e.g., $IrCl_3$, (+3 valence state), other iridium compounds, e.g., iridium acetylacetonate (+3 valence state), etc.; with suitable chemical reagents to accomplish the desired transformation of the iridium precursor to an active catalytic complex species. Such reagents include reducing agents, e.g., hydrogen, carbon monoxide, hydrazine, formic acid, phenylhydrazine, etc.; and oxidizing agents, e.g., elemental halogens ($I_2$ or $Br_2$), mineral acids (HCl, HBr, $HNO_3$, HI), peroxides ($H_2O_2$, cumene hydroperoxide, etc.).

This catalytic solution containing the necessary iridium and iodide components is then ready for use as discussed above, and may be employed as a liquid phase or vapor phase catalyst. Often it may be beneficial and desirable to have the concentration of the second component or promoter portion of the catalyst system, for example, iodide such as HI or $I_2$, in excess of that required to form a stoichiometric compound such as described above. In the same way the two components, e.g., an iridium compound and an iodine component are provided in a single molecule by beginning with iridium triiodide as the catalyst precursor for the reaction of an ethylenically unsaturated compound with carbon monoxide and water to produce an organic acid. The present discussion is based upon the catalyst precursors as charged. The ultimate nature of the catalyst as modified by reaction conditions, and the presence of promoters and reactants has not been completely elucidated. However, it has been found that the use of the components described herein provides a highly superior catalyst and improved process for the production of carboxylic acids.

As discussed above the reaction system consists of catalytic amounts of iodide and iridium components charged in critical ratios as defined herein. The use of catalytic quantities of these two components within critical ratios in the present invention is in contradistinction to prior art processes which employed certain halide promoters in substantially stoichiometric proportion to the olefinic feed, e.g., 1 mole of halide per mole (equivalent) of olefin. As discussed below the critical proportions of iodide-iridium catalyst system of the present invention results in significantly higher yields of carboxylic acid of the order of 1000 to 1,000,000 mole percent or more based upon halide and/or metal component charged.

The liquid reaction medium employed may be any solvent compatible with the catalyst system and may include pure olefins or saturated and unsaturated hydrocarbons, e.g., benzene, decane, eicosane, etc. Mixtures thereof with the desired carboxylic acid and/or other carboxylic acids such as nonaoic acid may be used. The preferred solvent and liquid reaction medium for the process of this invention is a monocarboxylic acid having 2 to 20 carbon atoms, e.g., acetic, propionic, hexanoic, decanoic, dodecanoic, naphthoic, oleic and elaidic acids, including isomeric forms. Water may optionally be added to the reaction mixture in excess of the stoichiometric quantity discussed below.

The present invention is based upon the production of carboxylic acids by the transformation of an ethylenically unsaturated compound, having from 2 to 30 carbon atoms, and containing the structural formula

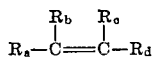

in aliphatic, acyclic, or cycloaliphatic form where $R_a$, $R_b$, $R_c$, and $R_d$ are moieties having from 0 to 20 carbon atoms and are selected from the group consisting of hydrogen, halogen, alkyl, alkene, aryl, cycloalkyl, and cycloalkene moieties.

Suitable feed stocks in the process of this invention are ethylenically unsaturated compounds. Suitable compounds include ethylene, propylene, butene-1; butene-2; hexenes, such as hexene - 1, and hexene - 2; octenes; dodecenes; hexadecene; 2 - methylpropene; vinylacetic acid, styrene; methylstyrene; vinylcyclohexene; 3,3 - dimethyl-1-butene; acrolein; methyl vinyl ketone; allyl alcohol; 2 - phenylbutene; 2 - cyclohexyl - butene; allene; allylamine; diallylamine; acrylonitrile; methyl acrylate; vinyl chloride; phosphopyruvic acid; and mixtures thereof.

However the preferred feed stocks are mono-olefinic hydrocarbons, including alpha and internal olefins, such as ethylene, propylene, butene-1, butene-2, isobutylene, hexene-1, hexene-2, dodecene-1, dodecene-6, 3,3-dimethyl-butene-1, and the like.

The process of the present invention is characterized by the formation of predominantly terminal, i.e., normal linear, carboxylic acids from alpha and internal olefins. In the case of branched and substituted olefinic feeds, for example isobutylene and vinylacetic acid, preferential reaction occurs to yield terminal carboxylic acid products, such as 3-methyl butyric acid and glutaric acid respectively. Such preferential reaction to yield the terminal carboxylic acid products is within the scope of the present invention to yield terminal and linear normal carboxylic acids selectively from olefinic and substituted olefinic feeds as discussed herein.

In accordance with the present invention, the carbonylation reaction may be carried out by intimately contacting an ethylenically unsaturated compound, which, depending on the carbon number and operating conditions, may either be in the vapor or liquid phase, with gaseous carbon monoxide and water (vapor or liquid) in a liquid phase containing critical proportions of the catalyst system as described herein prepared from $IrCl_3 \cdot 4H_2O$ or other iridium precursor, in the presence of iodine containing promoter, preferably as hydrogen iodide, under conditions of temperature and pressure suitable as described herein to form the carbonylation product. The particular conditions selected are the same whether the olefin is charged as a vapor or liquid. The temperature accordingly will be in the range of 50° C. to 300° C. with the preferred range being 125° C. to 225° C. Partial pressures of carbon monoxide of the order of 1 p.s.i.a. to 15,000 p.s.i.a. may be employed; however, 25 p.s.i.a. to 1,000 p.s.i.a. carbon monoxide partial pressure is generally preferred. Higher pressures may be used if desired under appropriate conditions.

Alternatively, carboxylic acids may be produced if desired via reaction of ethylenically unsaturated compounds with carbon monoxide and water in the vapor phase over the iridium containing catalyst systems described above, dispersed upon inert supports. Such a catalyst system may be operated as a conventional fixed bed catalytic reactor. For example, ethylene, aqueous hydrogen iodide, and carbon monoxide may be passed over a catalyst system consisting, for example, of $[Ir(CO)_2Cl]_2$ dispersed on an inert support material such as alundum, activated carbon, clays, alumina, silica-alumina, and ceramics, etc., in a fixed bed reactor maintained at elevated temperature and pressure, as described above, to produce propionic acid in high yield. However, use of a liquid reaction medium is preferred in the process of this invention using dissolved or dispersed active catalytic and promoter components.

A typical carbonylation reaction selective to carboxylic acid requires at least one mole of carbon monoxide and one mole of water per mole (equivalent) of ethylenically unsaturated linkage reacted. Excess of carbon monoxide and water over the aforesaid stoichiometric amounts, however, may be present. Carbon monoxide streams containing inert impurities such as carbon dioxide, methane, nitrogen, noble gases and paraffinic hydrocarbons having from 1 to 4 carbon atoms, may be employed, if desired, for example from an available plant gas stream, with no ill effect; however, in such cases total reactor pressure will have to be increased to maintain a desired carbon monoxide partial pressure. The concentration of carbon monoxide in the feed gas mixture is from 1 vol. percent to 99.9 vol. percent, a preferred range being from 10 vol. percent to 99.9 vol. percent.

The reaction rate is dependent upon catalyst concentration and temperature. Concentrations of the iridium compound or the first component of the catalyst system in the liquid phase, between $10^{-6}$ moles/liter and $10^{-1}$ moles/liter, are normally employed, with the preferred range being $10^{-4}$ moles/liter to $10^{-2}$ moles/liter. Higher concentrations even to the extent of 1 mole/liter may, however, be used if desired. Higher temperatures also favor higher reaction rates.

The concentration of the second component or promoter portion of the catalyst system may vary widely over the broad concentration range of $10^{-6}$ moles/iliter to 18 moles/liter, based on halogen atom. In the process of this invention, however, the preferred critical range of ratios of iodide atoms to metal atoms must be maintained as discussed herein to achieve the superior results.

The active iridium catalytic component is preferably supplied as a catalyst solution. The solution can also include liquid reactants, products and mixtures thereof which function as solvents or reaction media.

The ethylenically unsaturated feed stock is normally charged with equimolar amounts of water, although more water may optionally be used. The use of ethylenically unsaturated linkage compounds in the above ratios is on the basis that at least a molar quantity of water is present equivalent to the number of moles of ethylenically unsaturated linkage reacted.

The iridium catalysts of the present invention are characterized by a high degree of specificity for the carbonylation reaction, e.g., the reaction of ethylenically unsaturated compounds with carbon monoxide and water to obtain carboxylic acids. Such control over the various competing reactions to obtain the carboxylic acid in high yield is surprising since other metal catalysts do not show such specificity. The iron group metals such as iron, cobalt and nickel differ from the present iridium catalysts in that the iron group metals also produce a number of oxygenated products such as alcohols, aldehydes and ketones in addition to carboxylic acid. Furthermore, the iron group catalysts, particularly cobalt and nickel, require a far higher carbon monoxide partial pressure to remain stable. When moderate pressures, e.g., less than 2,000 p.s.i.a. carbon monoxide partial pressure are employed, at a temperature of 175° C., the cobalt and nickel catalysts are found to plate out or decompose to the free metal which plates on the walls of the reactor and is thus lost as a catalyst.

Another distinction of the iridium catalysts over the cobalt catalysts is the elimination of undesirable gaseous by-products, including carbon dioxide and methane which are obtained as a result of the water-gas shift reaction which is strongly catalyzed by cobalt.

Another distinction of the present process over prior art processes is that hydrogen is not employed with the ethylenically unsaturated feed stock, and consequently aldehydes and alcohols are not produced as in hydroformylation processes.

For a better understanding of the process of the present invention specific embodiments of the process are presented below. These examples and illustrations are not to be construed in any way as limiting the scope of the invention.

EXAMPLE 1

A batch reactor is charged with the following ingredients: 0.180 grams ($5 \times 10^{-4}$ moles) of an iridium compound having the formula $IrCl_3 \cdot 4H_2O$, as catalyst precursor; 0.9 ml. (0.005 moles) of a promoter component consisting of 47 wt. percent aqueous hydrogen iodide; 41 ml. of glacial acetic acid and 7.3 ml. $H_2O$ as solvent; and 50 ml. (0.4 moles) of hexene-1 having the structural formula $H_2C=CH(CH_2)_3CH_3$ as feedstock. The ratio of I/Ir is 10:1.

The reactor is pressurized with carbon monoxide to a total pressure of 700 p.s.i.g. (p. press of CO about 600 p.s.i.), at 195° C. The reaction is carried out at constant pressure by feeding CO upon demand, from a high pressure reservoir. Reaction time is 3 hours.

The reaction mixture subsequently analyzed by gas chromatographic technique, yields a solution containing:

| | Wt. percent |
|---|---|
| Unreacted hexene | 2.3 |
| Miscellaneous intermediates including iodides | 0.6 |
| Acetic acid solvent | 51.4 |
| Heptanoic acids | 45.7 |

The selectivity of $C_7$ terminal acid (n-heptanoic acid) is 71.6 mole percent at a greater than 95% olefin conversion level. No other organic oxygenated compounds such as alcohols, aldehydes, ketones, etc., are produced from the olefin feed as determined by gas chromatographic analysis. No substantial amounts of other undesirable by-products such as methane, carbon dioxide, or higher carboxylic acids are formed.

The rate of reaction varies somewhat during the reaction time in the batch system due to the change in reactant concentrations. It has been found that the average rate during the first hour of reaction is an excellent representation of catalyst system reactivity. In the examples which follow this rate is expressed in terms of gm.-moles/hr.-liter reacted as determined from the carbon monoxide consumptions. For the 10/1 I/Ir atomic ratio of this example the average rate was 2.8 g.-moles/hr.-liter.

In this and subsequent examples reaction rates have been maintained slow and conversion low in order to more clearly demonstrate the concept of critical ratio.

Based on the number of moles of iodide promoter charged to the reactor the molar yield of $C_7$ acid is 7000%.

EXAMPLES 2–12

Using the same experimental conditions, and catalyst as in Example 1, except varying the ratio of iodide promoter to iridium (I/Ir atomic ratio) the following results were obtained in the synthesis of heptanoic acids from hexene-1.

Table I

These results show the marked selectivity for the terminal normal acid production versus the branched chain acid isomers employing ratios of I/Ir within the critical range described herein.

The results also show that an optimum reactivity, production and yield, relative to iodide promoter, occurs in the carboxylic acid synthesis within the same critical range of I/Ir ratios. Note that at higher I/Ir ratios the synthesis reaction is no longer catalytic with respect to the iodide component. The synthesis reaction behavior approaches that of a stoichiometric reaction wherein the iodide component behaves as a reagent as demonstrated by the percent molar yield based on iodide becoming 100% or less.

TABLE I.—EXAMPLES 1-12

Run conditions:
 $IrCl_3 \cdot 4H_2O$ $5 \times 10^{-3}$ moles/liter
 Pressure—700 p.s.i.g. total
 Solvent—Acetic acid
 Olefin—Hexene-1, 0.40 moles
 Temp. 195° C. (partial pressure CO about 600 p.s.i.)
 Water (total)—0.44 moles
 Reaction time—3 hours

| Example | Iodide promoter | Ratio I/Ir | Rate [a] | Heptanoic acid production [b] | | Selectivity to n-$C_7$ acid, mole percent | Percent molar yield of $C_7$ acid based on iodide promoter charged |
|---|---|---|---|---|---|---|---|
| 1 [c] | HI aq | 10:1 | 1.00 | 45.7 | 2½ hrs | 71.6 | 7,000 |
| 2 | HI aq | 2:1 | 0.32 | 27.6 | | 74.6 | 21,000 |
| 3 | HI aq | 3:1 | 0.76 | 41.0 | | 72.7 | 21,000 |
| 4 | 2 iodohexane | 10:1 | 0.72 | 44.7 | | 69.1 | 6,800 |
| 5 | HI aq | 20:1 | 1.10 | 45.8 | 3½ hrs | 64.8 | 3,000 |
| 6 | HI aq | 30:1 | 1.00 | 43.0 | | 60.5 | 2,200 |
| 7 | HI aq | 55:1 | 0.32 | 28.4 | | 46.8 | 760 |
| 8 | 2 iodohexane | 55:1 | 0.76 | 46.1 | | 51.8 | 1,280 |
| 9 | HI aq | 90:1 | 0.23 | 18.0 | | 22.9 | 310 |
| 10 | $CaI_2$ | 90:1 | 0.23 | 13.0 | | 43.0 | 220 |
| 11 | HI aq | 169:1 | 0.1 | 0.5 | | | 40 |
| 12 | 2 iodohexane | 180:1 | 0.56 | 33.5 | | 23.0 | 280 |

[a] Rate referred to that of Example 1 for I:Ir ratio of 10:1.
[b] $C_7$ acid production equals weight percent in final solution (theoretical maximum wt.: 50% at total conversion of hexene-1 to heptanoic acid).
[c] Shown for comparison.

EXAMPLE 13

The reactor system of Example 1 is charged with the following ingredients: 0.0180 grams ($5 \times 10^{-5}$ moles) of an iridium compound having the formula $IrCl_3 \cdot 4H_2O$ as catalyst precursor; 0.09 ml. ($5 \times 10^{-4}$ moles) of a promoter component consisting of 47 wt. percent aqueous hydrogen iodide, 77 ml. of glacial acetic acid and 8.0 ml. $H_2O$ as solvent; the olefin feedstock is ethylene, $CH_2=CH_2$, charged to the reactor as a 1:1 molar mixture with carbon monoxide.

The reactor is pressurized with the gas mix. to a total pressure of 400 p.s.i.g. (p. press CO to about 150 p.s.i.) at 195° C. The reaction is carried out at constant pressure by feeding the gas blend upon demand from a high pressure reservoir. Reaction time is 3½ hours.

The reaction mixture subsequently analyzed by gas chromatographic technique yields a solution containing

|  | Wt. percent |
|---|---|
| Propionic acid product | 10.1 |
| Acetic acid solvent | 83.6 |
| Unreacted water | 5.7 |
| Miscellaneous intermediates including iodides | 0.6 |

The selectivity to propionic acid is greater than 99%.

No other organic oxygenated compounds such as alcohols, aldehydes, ketones, etc., are produced from the olefin feed as determined by gas chromatographic analysis. No substantial amounts of other undesirable by-products such as methane, ethane, carbon dioxide or higher carboxylic acids are formed.

For the 10/1 I/Ir atomic ratio of this example the average rate is 0.55 g.-moles/liter-hour. Based on no. of moles of iodide promoter charged the molar yield of $C_3$ acid is 24,000%.

EXAMPLES 14-19

Using the same experimental conditions and catalyst as in Example 13 except varying the ratio of iodide promotor to iridium the following results are obtained in the synthesis of propionic acid from ethylene supplied as a 1:1 $C_2H_4$/CO blend.

Table II

The results show as do those for hexene in Examples 1-12 that an optimum reactivity, production and yield, relative to iodide promoter, occurs in the synthesis of carboxylic acids within the critical range of I/Ir atomic ratios described herein.

TABLE II.—EXAMPLES 13-19

Run conditions:
 $IrCl_3 \cdot 4H_2O$ 5×10⁻⁴ moles/liter
 Solvent—Acetic acid
 Olefin—Ethylene
 Temp. 195° C.
 Pressure 400 p.s.i.g. total (p. press CO about 150 p.s.i.)
 Water (total)—0.44 moles
 Reaction time—3½ hours

| Ex. | Iodide promoter | Ratio I/Ir | Rate ᵃ | $C_3$ acid production ᵇ | Percent molar yield of $C_3$ acid based on iodide promoter charged |
|---|---|---|---|---|---|
| 13 ᶜ | HI | 10:1 | 1.00 | 10.1 | 24,000 |
| 14 | HI | 3:1 | 0.62 | 4.4 | 34,000 |
| 15 | HI | 25:1 | 1.50 | 10.4 | 10,000 |
| 16 | HI | 90:1 | 0.62 | 6.6 | 1,760 |
| 17 | HI | 270:1 | 1.00 | 6.7 | 575 |
| 18 | Ethyl iodide | 270:1 | 0.12 | 6.1 | 530 |
| 19 | HI | 1,100:1 | No reaction | | 0 |

ᵃ Rate referred to that of Example 13 for I:Ir ratio of 10:1.
ᵇ $C_3$ acid production equals weight percent in final reaction solution.
ᶜ Shown for comparison.

EXAMPLES 20-27

The reactor system of Example 1 is charged with various olefin feed stocks at similar reaction conditions as shown in the examples below. The results demonstrate that the concept of critical ratios of I/Ir catalyst components is broadly applicable to other olefin feed stocks regardless of carbon chain length and structure (i.e. double bond position and degree of branching). Note that comparable high selectivity to terminal and/or normal acid at high production is attained relative to the previous examples employing hexene-1 and ethylene. Even internal dodecene yields predominantly normal tridecanoic acid and isobutylene yields the terminal carboxylic acid product 3-methylbutyric acid.

TABLE III.—EXAMPLES 20-27

| Example | Olefin | Ratio I/Ir | Solvent | Temp., ° C. | Acid production ᵃ | Selectivity to normal acid, mole percent |
|---|---|---|---|---|---|---|
| 20 ᶜ | Hexene-1 | 10:1 | Hexanoic acid | 195 | 53% $C_7$ acid | 72 |
| 21 | Hexene-2 | 10:1 | do | 175 | 58% $C_7$ acid | 69 |
| 22 | do | 55:1 | do | 175 | 41% $C_7$ acid | 62 |
| 23 | Pentene-1 | 10:1 | Benzene | 175 | 38% $C_6$ acid | 74 |
| 24 | Pentene-2 | 10:1 | do | 175 | 40% $C_6$ acid | 71 |
| 25 | Dodecene-1 | 10:1 | Hexanoic acid | 175 | 38% $C_{13}$ acid | 59 |
| 26 | Isomerized dodecene | 3:1 | do | 195 | 29% $C_{13}$ acid | 36 |
| 27 | Isobutylene | 10:1 | Nonanoic acid | 175 | 30% $C_5$ acid | ᵇ 90 |

ᵃ Weight percent desired acid product in final reaction solution.
ᵇ 3-methyl butyric acid represents the least branched acid product formed by attack on the terminal olefinic carbon, i.e. terminal carboxylic acid product.
ᶜ Shown for comparison.

What is claimed is:

1. In a process for the transformation of ethylenically unsaturated compounds having from 2 to 30 carbon atoms, and containing the structural unit

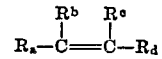

in aliphatic, acyclic, or cycloaliphatic form where $R_a$, $R_b$, $R_c$, and $R_d$ are moieties having from 0 to 20 carbon atoms and are selected from the group consisting of hydrogen, halogen, alkyl, alkene, aryl, cycloalkyl, and cycloalkene moieties to obtain a carboxylic acid, which process comprises contacting the said compound with carbon monoxide and water in the presence of a catalyst system consisting essentially of an iridium compound and an iodide promoter, present in a liquid phase, at a temperature from 50° C. to 300° C. and a partial pressure of carbon monoxide of 5 p.s.i.a. to 1,000 p.s.i.a., the improvement consisting of conducting the said transformation within the range of atomic ratios of iodide to iridium of 3:1 to 100:1 to obtain predominantly terminal carboxylic acids.

2. Process as in claim 1 in which the ethylenically unsaturated compounds comprise at least one mono-olefin having from 2 to 30 carbon atoms, and the products are saturated mono-carboxylic acids having predominantly a terminal carboxylic acid structure.

3. Process as in claim 2 in which the ethylenically unsaturated compounds are mono-olefins having from 4 to 8 carbon atoms.

4. Process as in claim 2 in which the ethylenically unsaturated compounds are mono-olefins having from 9 to 16 carbon atoms.

5. Process as in claim 2 in which the said ethylenically unsaturated compound is ethylene and the product is propionic acid.

6. Process as in claim 1 in which the said iridium compound is an iridium halide.

7. Process as in claim 1 in which the said iridium compound is an iridium chloride.

8. Process as in claim 1 in which the said iridium compound is an iridium carbonyl halide.

9. Process as in claim 1 in which the said promoter is aqueous hydrogen iodide.

10. Process as in claim 1 in which the reaction medium includes a carboxylic acid having from 2 to 20 carbon atoms.

11. Process as in claim 1 wherein the catalyst system is acidic.

References Cited
UNITED STATES PATENTS

| | | | |
|---|---|---|---|
| 3,020,314 | 2/1962 | Alderson | 260—533 AX |
| 3,641,074 | 2/1972 | Fenton | 260—533 AX |
| 3,579,551 | 5/1971 | Craddock et al. | 260—413 |

LORRAINE A. WEINBERGER, Primary Examiner

R. O. KELLY, Assistant Examiner

U.S. Cl. X.R.

260—465.4, 485 R, 514 M, 526 R, 532, 533 A, 534 R, 537 R, 539,R, 515 R